FIG. 1

INVENTOR
ARDA BOGOSIAN
BY
Dike, Thompson, Bronstein & Mrose
ATTORNEYS

United States Patent Office 3,303,316
Patented Feb. 7, 1967

3,303,316
METHOD AND MEANS FOR ELECTRIC WELDING
Arda Bogosian, Cambridge, Mass. (P.O. Box 115,
North Postal Annex, Boston, Mass. 02114)
Filed Feb. 19, 1964, Ser. No. 345,895
28 Claims. (Cl. 219—80)

The present invention relates to apparatus for electric welding, particularly electric resistance spot welding.

The present art of electric resistance spot welding consists of bringing two electrodes into intimate contact with the two pieces of metal to be joined with sufficient initial pressure to permit passage of a low voltage electric current which heats the metals to the correct fusion point. The pressure of the electrodes is now increased to force the molten metals in the two pieces into one homogeneous slug and this pressure is held until the weld metal has set.

In some cases enormous pressures must be provided to overcome the inertia of the masses involved and provide what is called rapid follow up or increase of the welding electrode pressure at the correct instant of fusion. This is a requisite with some metals inasmuch as the fusion point is so narrow in temperature range. Current timing to bring the metals to the fusion point requires only a few cycles of current and the electrode must be capable of providing this follow up pressure at the correct instant of flux fusion as the difference in time between the solid state and the fusion point is practically nil.

The present invention accomplishes this with much lighter masses and pressures by providing a controlled impact force at the required instant. Such an impact blow with a small mass provides an instantaneous forging or working force greater than a much heavier static pressure or mass.

Devices to accomplish somewhat similar objectives for spot welding have been attempted but employ undesirably cumbersome magnetic devices which require rectified D.C. and do not produce a true impact force. Other devices make use of nuematic or hydraulic devices to apply pressure. All of these devices have inherent time variations in operation due to: (1) cylinder blow-by; (2) valve leakage; (3) varying friction in the cylinder; (4) varying friction in the valves; (5) varying line pressures; (6) varying characteristics of valves and mechanical switches; and (7) mushrooming of welding tips during use. Due to these inherent variations, these devices cannot maintain exact synchronization of weld current and weld pressure or impact. In none of these devices has any means been provided to compensate for these variables and thereby maintain exact synchronization of weld current initiation and cut-off with impact. Without proper provision for maintaining this relationship any spot welding device becomes impractical as in some instances when the welding current is out of phase with impact by as little as 2 cycles of current a bad weld can result.

This invention accomplishes mechanically the required objective with no built-in variables so that once the requisites of current and impact are synchronized this condition can be easily maintained. The only variable is mushrooming of tips and this invention provides means for compensating for this condition.

In addition to these advantages, other objects of this invention are to provide:

(1) An adjustable independent initial electrode pressure for current passage;

(2) An adjustable independent impact force of sufficient magnitude and consistently at the correct instant to perform the weld by means of an impact member or anvil of relatively small mass propelled and controlled without the use of magnets and without the use of hydraulic or pneumatic motors;

(3) Means for holding an increased electrode pressure after impact until the weld metal has set;

(4) Means for controlling the depth of electrode penetration in the weld metal;

(5) Means for adjusting welding current initiation and cut-off points so as to allow a predetermined length of heat time;

(6) Means of adjustment of welding current initiation and cut-off points relative to instant of impact so that impact may consistently occur at any predetermined interval of time before or after current cut-off;

(7) Means of adjustment of welding current initiation and current cut-off points relative to flight time of anvil stroke to compensate for varying velocity of the anvil due to varying initial propelling force or pressure on the impact anvil;

(8) An initial contact pressure on the welding electrode that may be greater than anvil propelling force or conversely less than anvil propelling force without affecting the timing of the elements;

(9) An improved, reliable spot welding apparatus of sturdy, inexpensive and simple design in which welding pressure is initially applied to the electrode followed by impact in timed sequence with current initiation and cut-off, with minimum uncontrolled variations in adjusted time sequence and pressure magnitudes and without the use of hydraulic or pneumatic motors or magnets;

(10) An improved spot welding apparatus having means for correctly and adjustably synchronizing current initiation and impact and for maintaining such synchronized condition, such apparatus having no built in variables which will affect such sychronization;

(11) Compensation for mushrooming of welding tips and any other variable while at the same time maintaining synchronization.

Other objects and advantages of the invention will be apparent from the following description and accompanying drawings of two embodiments of the invention for illustrative purposes, in which drawings.

Referring to the drawings, lower electrode 33 is mounted on electrode bracket 33a which is in turn vertically adjustable on machine frame 33b to thereby adjust the height of electrode 33. Upper electrode 32 is attached to the lower end of pressure member or shank 30 (of circular cross-section) through electrode bracket 35, which bracket is attached solid to such lower end of shank 30. Both electrode brackets 35 and 33a are electrically connected to the welding transformer secondary coil 36a (FIG. 1) through suitable flexible conductors (not shown) and complete the secondary circuit 36b of the welding transformer through the electrodes and work 34.

Figure 2:
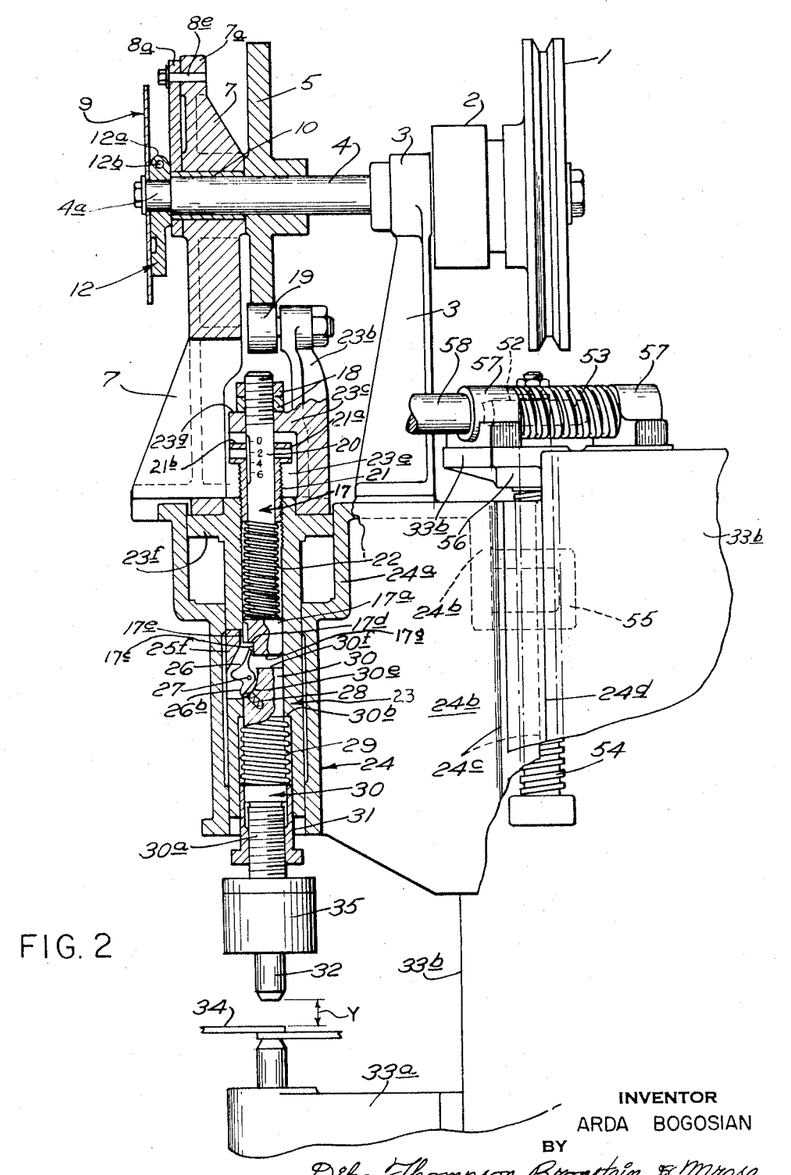
FIG. 2 is a section taken along the line 2—2 of FIG. 1.

Shank 30 is under pressure of spring 29 and this pressure may be varied by means of internally threaded sleeve 31 which is threaded over threaded portion 30a on 30, as shown in FIG. 2. Spring 29 acts between shoulder 30b of an elongated, cylindrical, hollow housing 23, in the lower end of which the upper portion of shank 30 is slidably received, and the shank 30 through the sleeve 31 (the lower end of the spring engages the upper end of the sleeve) to urge the shank 30 downwardly out of the housing 23 toward the work, the lower portion of shank 30 to which the bracket 35 and electrode 32 are attached protruding downwardly below the lower end of housing 23.

Figure 5:
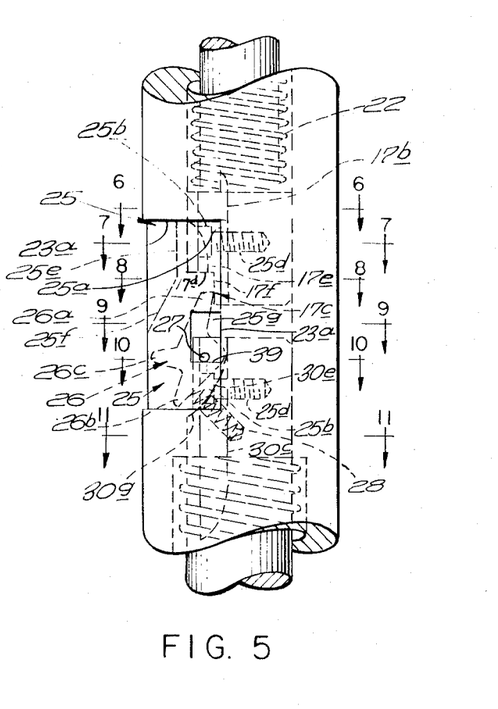
FIG. 5 is a view in elevation of a middle part of the apparatus of FIG. 1, showing the ends of the impact or anvil member and the presure member connected to the upper electrode and against which the anvil impacts and a portion of the housing in which such members are slidably carried and received.
Figure 6:
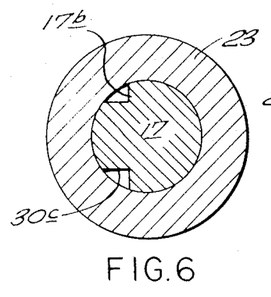
FIG. 6 is a view taken along the line 6—6 of FIG. 5.
Figure 9:
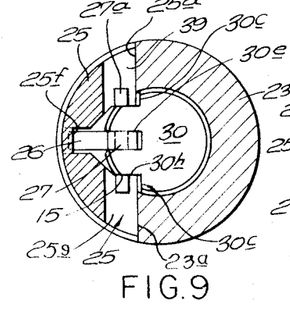
FIG. 9. is a view taken along the line 9—9 of FIG. 5.
Figures 10, 11:
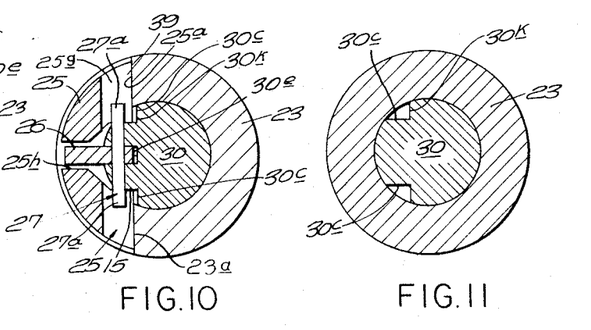
FIG. 10 is a view taken along the line 10—10 of FIG. 5.
FIG. 11 is a view taken along the line 11—11 of FIG. 5.

The periphery of the upper end portion of shank 30 has a pair of oppositely disposed, squared, vertical recesses 30c (FIGS. 5, 9 to 11 and 14) and a vertical groove 30e located between such recesses, which groove extends to the top face 30f (FIGS. 2, 5, 9, 10 and 14) of shank 30 and the lower end of which slopes radially outwardly at 30g (FIG. 5) to the shank periphery. Recesses 30c also extend to the top face 30f of shank 30. A dog 26 (FIGS. 2, 5, 9, 10 and 14) is pivotally mounted in groove 30e by means of a pin 27, which extends horizontally through the dog 26 and the shank 30 and the ends of which protrude outwardly into the recesses 30c at 27a (FIGS. 9 and 10). Dog 26 has an upwardly extending detent finger 26a (FIG. 5), a downwardly extending tail 26b and a radially outwardly protruding release portion 26c which protrudes radially outwardly beyond the groove 30e and the periphery of shank 30 (FIGS. 2 and 5).

The reduced diameter portion of the circular bore of cylindrical housing 23 above shoulder 30b fits snugly but slidably about the upper portion of the round shank 30 whereas the lower larger diameter portion of such bore fits snugly but slidably about the cylindrical sleeve 31, which is threaded to and moves axially with shank 30.

Slidably received in the upper portion of the bore of housing 30 directly above and axially aligned with shank 30, is impact anvil member or shank 17 (of circular cross section), which is urged downwardly toward shank 30 by spring 22 acting between shoulder 17a of shank 17 and housing 23 through externally threaded sleeve 21, which is threaded in the upper threaded end of the bore of housing 23 and in which shank 17 is snugly but slidably received, as shown, the pressure of the spring 22 on shank 17 being adjustable by threading sleeve 21 more or less into the bore. The upper end of sleeve 21 has an integral, short, hollow cross piece or nut portion 21a and the periphery of shank 17 at that area has a graduated scale 20 thereon which cooperates with the upper edge 21b of cross piece 21a to indicate adjusted spring pressures of spring 22. Sleeve 21 is turned to adjust spring pressure by inserting a length of rigid material within the hollow cross piece.

Housing 23 has attached fast to the top thereof a yoke 23b which extends upwardly from the top of the housing and has rotatably mounted at the top thereof a cam follower 19. Yoke 23b is also provided with a flange 23c through which the top portion of shank 17 slidably extends. Shank 17 is maintained in adjustable vertical position in housing 23 by means of jam nuts 18 which are threaded over the threaded end of shank 17 above flange 23c and are forced downwardly into engagement with the top surface 23g of flange 23c by spring 22. The normal vertical position of the shank 17 in the housing 23 above the pressure member 30 is adjustable by turning nuts 18 on shank 17. This also changes the pressure of spring 22.

Figure 1:
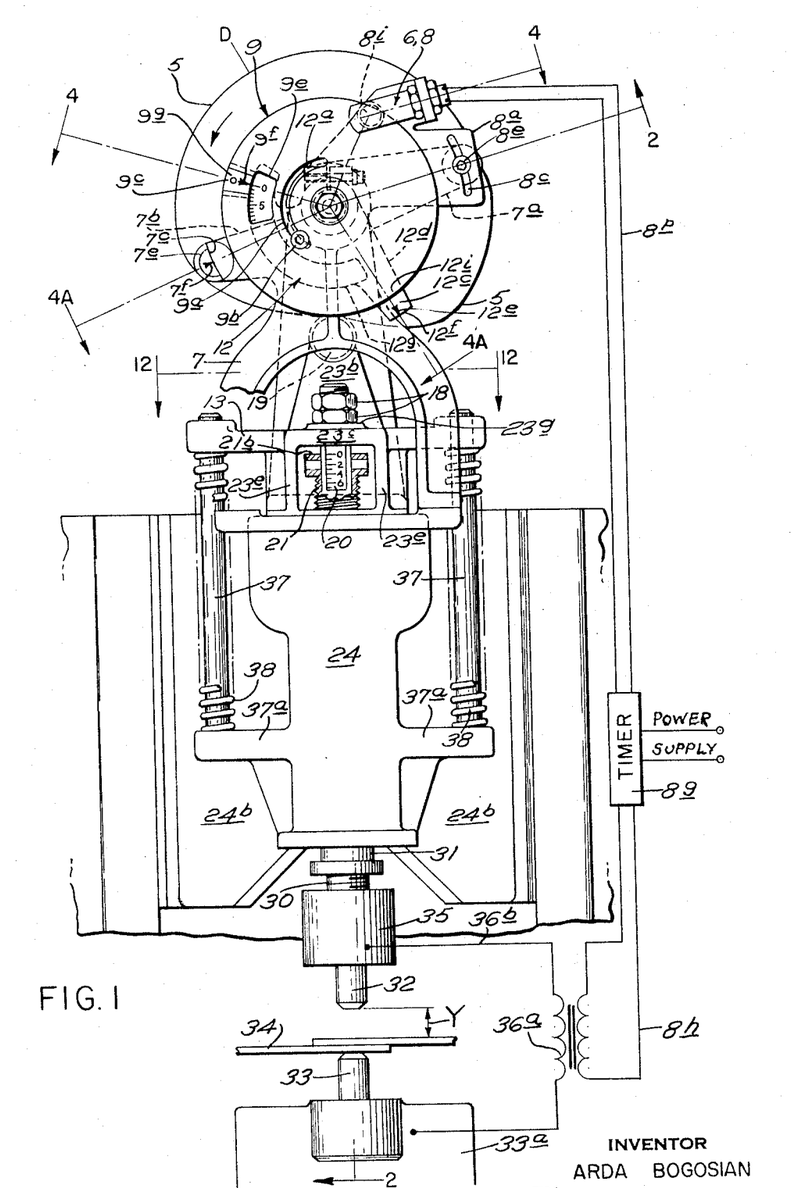
FIG. 1 is a front view in elevation of spot welding apparatus embodying the present invention in non-weld position, the electrical weld circuit being shown diagrammatically.

Flange 23c has a pair of parallel vertical walls 23e extending vertically and integrally downwardly therefrom to the top of housing 23, such walls also extending integrally from the yoke 23b to form a housing in which is housed the scale portion 20 of anvil 17 and the nut portion 21a of sleeve 21, both of which are visible and accessible through the open front of such housing, as shown in FIG. 1.

The lower enlarged end of shank 17 is normally spaced above the upper end face 30f of shank 30, as shown in FIG. 2. The periphery of the lower enlarged end portion of shank 17 has a pair of squared, vertical side recesses 17b therein (FIGS. 5, 6, 7, 8 and 14) corresponding to, of the same cross-sectional shape and size as, and vertically aligned with, recesses 30c in shank 30 and extending downwardly to the lower end face 17g of shank 17.

The edge of such lower end face 17g between the vertical recesses 17b is recessed or notched at 17c over dog 26, to form a squared recess 17c running horizontally from one vertical recess 17b to the other and having a flat upper wall 17d and a flat side wall 17f (FIGS. 2, 5, 8 and 14). Above recess 17c is a vertical groove 17e which extends upwardly from the upper wall 17d and the upper end of which curves radially outwardly to the shank periphery. Recess 17c and groove 17e are directly above and aligned with the dog 26. The lower enlarged end of shank 17 is snugly but slidably received in the bore of housing 23 and the upper reduced diameter of shank 17 is snugly but slidably received in the sleeve 21 which is threaded in the housing.

One side of the housing 23 at the middle thereof opposite the upper end portion of shank 30 and dog 26 as well as the lower opposed end portion of shank 17, including recess 17c and groove 17e, is cut away at 23a (FIGS. 5, 7 to 10 and 14) and is replaced by a generally arcuate shaped block 25, the side edges 25a of which abut against the cut away side edges 23a of the housing. The upper and lower portions of the periphery of block 25 are each provided with a pair of oppositely disposed, squared recesses 25b (FIGS. 5 and 7) to provide flat walls 25c for passage of threaded screws 25d into edges 23a of housing 23 to attach the block 25 fast to the housing 23 as shown in FIGS. 5 and 7.

Figures 7, 8:
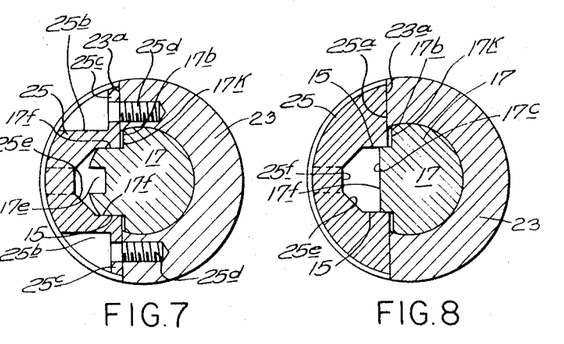
FIG. 7 is a view taken along the line 7—7 of FIG. 5.
FIG. 8 is a view taken along the line 8—8 of FIG. 5.

The internal surface of the block 25 is shaped, as shown in FIGS. 7 and 8, with opposed, internal, machined, flat, side walls 15 at the upper end of the block slidably engaging the opposed machined flat walls 17f formed by the recesses 17b in shank 17 and with such walls 15 at the lower end of the block slidably engaging the corresponding machined flat walls 30h formed by the recesses 30c in the lower shank (FIGS. 9 and 10) to thereby restrain anvil 17 and shank 30 from rotation and maintain them in proper alignment. The side edges 25a of block 25 abutting the edges 23a of housing 23 and extending radially inwardly beyond such surfaces 23a are spaced slightly from the flat surfaces forming the other walls 17k and 30k (FIGS. 7 to 10) of recesses 17b and 30c. The inner surface 25e of block 25 opposite recess 17c and groove 17e of shank 17 and opposite groove 30e and dog 26 of shank 30 is spaced from the shank peripheries in which such recess and grooves are located and is provided with a tapered surface 25f, as shown in FIGS. 2, 5 and 7 to 10.

The sides of the mid-portion of block 25 adjacent the edges 25a thereof abutting edges 23a of housing 23, have rectangular windows 25g (FIGS. 5, 9, 10 and 14) therein having flat lower edges 39. Also, below the tapered surface 25f the block 25 has a vertical groove 25h (FIG. 10) extending therethrough for receiving the dog 26.

The ends 27a of pin 27 protrude outwardly beyond the shank 30 over the flat surfaces 39 of the block 25 (FIGS. 9 and 10). Engagement of such ends 27a with such surfaces 39 maintains the shank 30 in position in the housing 23, the spring 29 normally urging such ends 27a downwardly against such surfaces, as shown.

Figure 14:
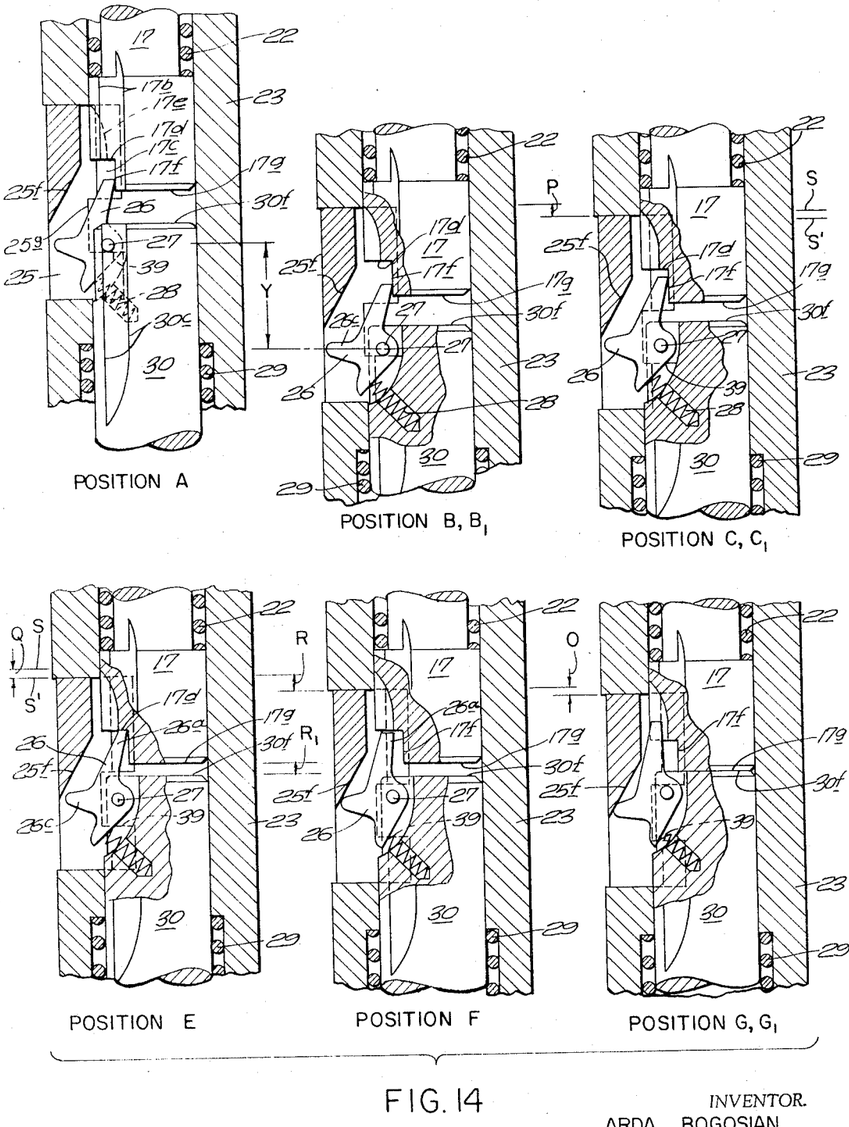
FIG. 14 is a series of views like FIG. 5 but in vertical cross section, showing the positions of the parts, i.e. the anvil pressure member and housing housing them, sequentially at each of the stages indicated in FIG. 13, and with the amount of movement of the housing between such stages indicated by the same letters referred to in FIG. 14.

Spring 28 (FIGS. 2 and 5) located in an inclined recess in the floor of groove 30e engages the tail 26b of dog 26 to urge the dog to rotate in a clockwise direction into recess 17c in the bottom of shank 17 and against the vertical wall 17f of such recess, as shown in FIGS. 2, 5 and 14.

Dog 26 is tripped by downward movement of inclined surface 25f on block 25 with respect to shank 30 and dog 26, which inclined surface engages projection 26c to force the dog to rotate counter-clockwise out of recess 17c.

Cylindrical housing 23 is slidably received within a hollow cylindrical housing bracket 24 (FIG. 2) having an upper enlarged end portion 24a, in which end portion is snugly but slidably received the flange 23f of housing 23, as shown in FIG. 2.

Figures 12, 18:
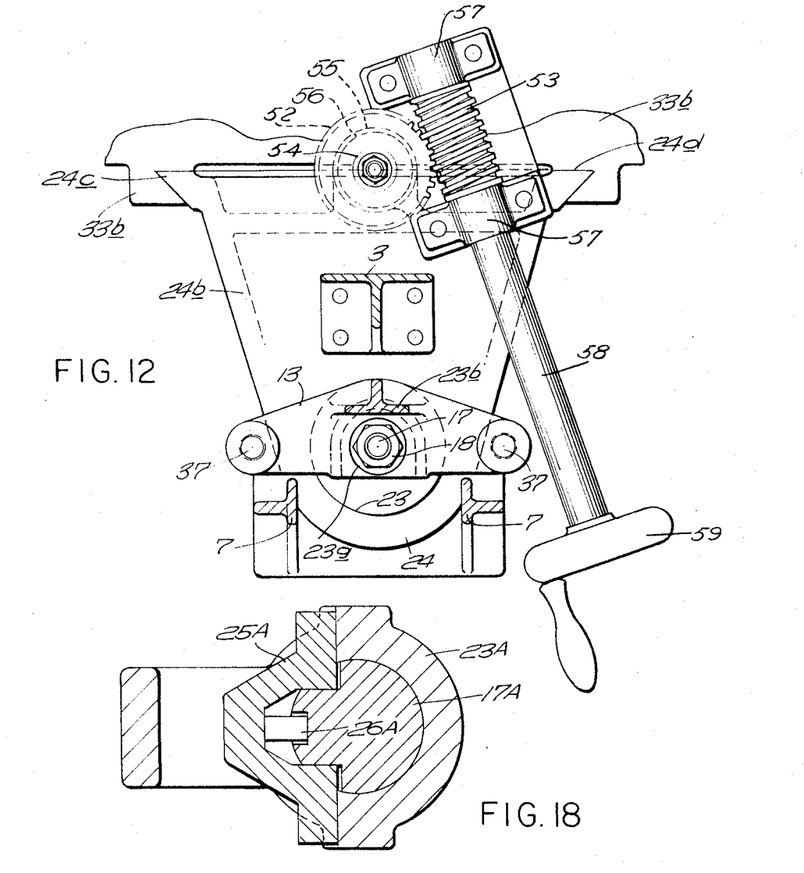
FIG. 12 is a view taken along the line 12—12 of FIG. 1.
FIG. 18 is a section taken along the line 18—18 of FIG. 16.

Housing bracket 24 is vertically adjustable on machine frame 33b by means of gibs 24c at the ends of bracket extensions 24b which extensions are integral with housing bracket 24 (see FIGS. 2 and 12). Gibs 24c are slidably received within the vertical undercut way 24d in the frame 33b, as shown. Handwheel 59 and worm 53 are fast to shaft 58. Worm 53 engages worm wheel 52 which is fast to vertical screw 54. Shaft bearings 57 for shaft 58 and screw bearing 56 for screw 54 are fixed on machine frame 33b. Threaded boss 55 is integral with bracket 24b, and receives the screw 54, as shown. Turning of handwheel 59 rotates screw 54 through worm 53 and worm wheel 52, which moves boss 55 vertically together with bracket extension 24b and housing bracket 24.

Cam follower or roll 19, yoke 23b and housing 23 are integral and move vertically together as a unit in and with respect to fixed housing bracket 24 through motion imparted thereto by cam 5 to be described in detail hereinafter.

A pair of vertical spring studs 37 (FIG. 1) are fast at their lower ends to a pair of ears 37a extending integrally and horizontally from frame housing 24. The upper ends of studs 37 are slidably received in apertures in a pair of ears 13 extending horizontally and integrally from yoke 23b and located directly above ears 37a. Springs 38 acting between frame ears 37a and ears 13 yieldably urge the slidable housing 23, including anvil 17 and pressure member 30 carried thereby, yoke 23b, flange 23c and cam follower 19, upwardly with respect to the frame housing 24 to the non-weld up position shown in FIGS. 1 and 2, with the cam follower 19 urged against the cam 5. In this position the upper surface 23g of flange 23c of housing 23 holds the anvil 17 in the housing in the vertical position shown and the surface 39 of block 25 holds the pressure member 30 in the housing in the vertical position shown with respect to the housing and the anvil.

Extending upwardly from the top of the fixed housing frame 24 and fast thereto are a forked frame yoke 7, with oppositely and radially extending bosses 7a and 7b at its upper portion, and a frame bracket 3 spaced from yoke 7. Rotatably mounted in the upper portions of 3 and 7 (FIGS. 1 and 2) is a drive shaft 4 on which is mounted for rotation therewith, cam 5. Combination fly-wheel and pulley 1 for driving shaft 4 and cam 5 idles on shaft 4 (in non-driving relation with the shaft) at a constant speed, for example 30 r.p.m. At this speed, $$\frac{60 \text{ sec.}}{30 \text{ r.p.m.}} = 2 \text{ sec./rev.}$$

2 sec.×60 cycles A.C. current in the weld circuit
=120 cycles/rev.

$\frac{360°}{120 \text{ cycles}} = 3°$ rotation of cam 5 and dial 12 per cycle of A.C.

Shaft 4 is driven by pulley 1 through single revolution clutch 2 and is normally at rest in the position shown in FIGS. 1 and 2 until clutch 2 is tripped either electrically or mechanically (not shown) by hand or automatically. Cam 5 is fast to shaft 4 in the position shown (FIGS. 1, 2 and 13) with cam roller 19 urged to up position against the low area on the cam and with clutch 2 disengaged.

Figures 3, 4B, 4C:
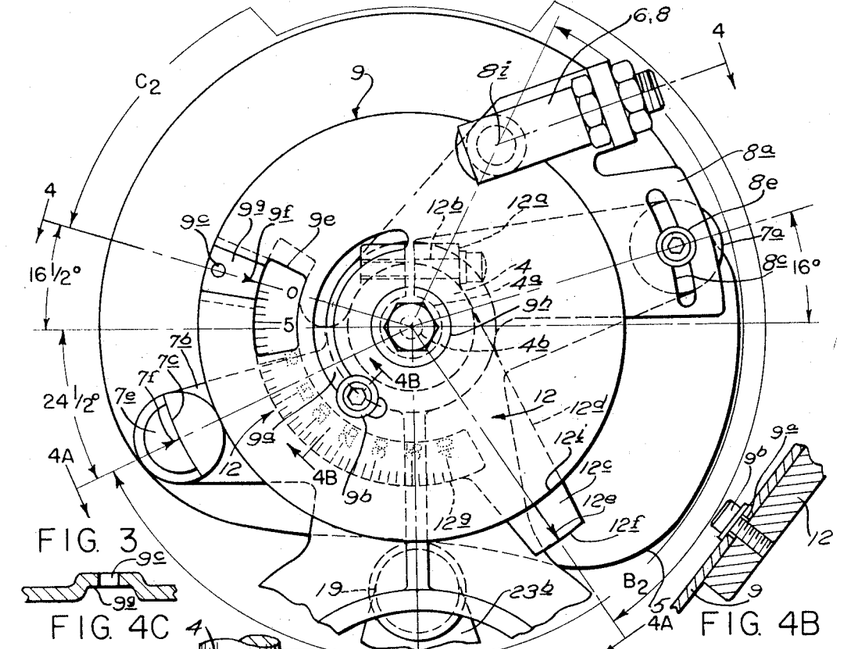
FIG. 3 is an enlarged view of the upper portion of the apparatus of FIG. 1.
FIG. 4B is a section taken along the line 4B—4B of FIG. 3.
FIG. 4C is a section taken along the line 4C—4C of FIG. 4.

A photo electric switch 8 with its light source 6 (FIGS. 1 and 4) is located in control circuit 8p, which controls the primary circuit 8h (FIG. 1) and the ignitron weld timer 8g which timer is located in these circuits. Switch 8 closes the circuit 8p when actuated by light from light source 6. When the light sensitive element 8i of switch 8 is exposed to light from 6, the switch 8 is closed. When such light is blocked, the switch 8 is open. Closing of circuit 8p closes circuit 8h to initiate weld current from the power source, as shown in FIG. 1 and actuates the timer 8g which shuts off weld current (opens circuit 8h) within a predetermined time after current initiation. Once circuit 8h is closed and timer 8g actuated by closing of switch 8, circuit 8h remains closed and timer 8g continues to function even after switch 8 is opened. Switch 8 and light source 6 are mounted on switch bracket arm 8a, as shown in FIGS. 1, 2 and 3, which is freely rotatable on sleeve 10 around shaft 4 and is adjustable about shaft 4 so as to adjust the angular position of the switch 8 together with its light source 6 about the shaft 4, by means of arcuate slot 8c in bracket arm 8a and threaded bolt and washer assembly 8e, the bolt of which is adapted to be threaded into a threaded hole in boss 7a of fixed bracket 7 aligned with slot 8c to lock the bracket arm 8a in adjusted angular position to the bracket 7a.

When the bolt 8e is tightened, as aforesaid, the switch bracket arm 8a is locked to fixed frame 7 in adjusted position against rotation with shaft 4, the free mounting of bracket 8a on sleeve 10 permitting the shaft 4 to rotate with respect to bracket 8a.

A graduated, crescent-shaped scale or dial member 12 is clamped fast to a reduced end portion 4a of shaft 4 (FIGS. 1, 2, 3, 4 and 4A) by means of the split clamp portion 12a and tightening screw 12b so that it rotates with shaft 4, the clamp portion permitting rotational adjustment of the dial 12 with respect to shaft 4. Dial 12 has a radially extending boss 12d, the end portion of which is raised at 12c. Raised portion 12c has a radially extending arrow 12e on its upper face. The outer periphery 12f of raised portion 12c is an arcuate, radial surface which passes by and close to arcuate, radial surface 7c of raised end portion 7e of boss 7b on fixed bracket 7 when the shaft 4 and dial 12 are rotated one revolution. The upper face of raised portion 12c of dial 12 is on the same level as the upper surface of raised portion 7e of bracket 7b. The upper surface of raised portion 7e has radially extending arrow 7f thereon as shown. The curvature of radial surface 12f corresponds closely to that of radial surface 7c. The inner surface 12i of raised portion 12c is also an arcuate, radial surface. The calibrations on the dial 12 are along its raised arcuate outer edge 12g (FIGS. 1, 2, 3, 4 and 4A).

Bracket 7 and bracket arm 8a and dial 12 are made such that the angle $C_2$ (FIG. 3), between arrow 12e on surface 12c of dial 12 and the 0 mark on dial 12, is approximately the same as angle $B_2$ between arrow 7f on surface 7e of boss 7b on bracket 7 and the light sensitive element 8i of switch 8 and light source 6 when slot 8c is in mid position with respect to the threaded hole in boss 7a of bracket 7, and both of these angles are in turn approximately the same as angle $A_2$ between A and F on cam 5 (FIG. 13), the reason for this being explained hereinafter.

Figures 4, 4A:
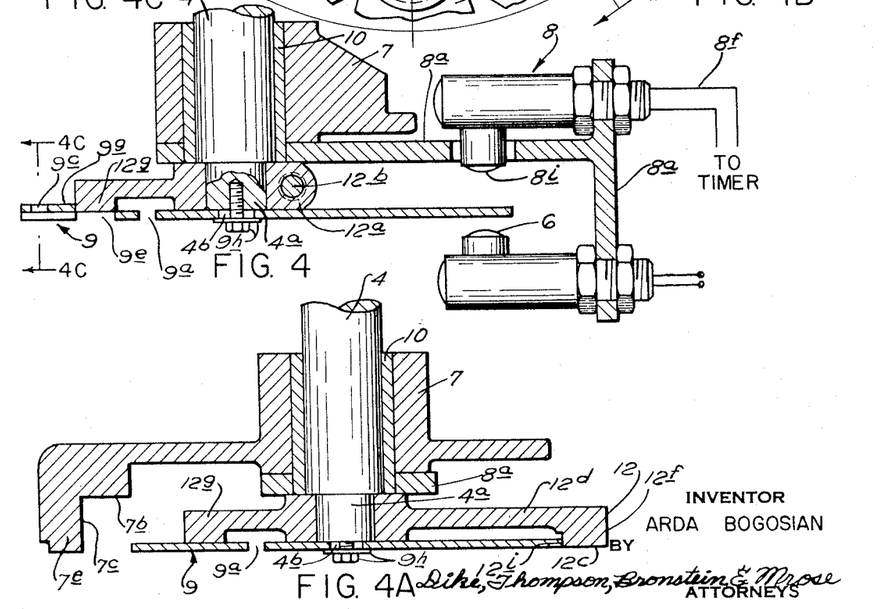
FIG. 4 is a section taken along the line 4—4 of FIGS. 1 and 3.
FIG. 4A is a section taken along the line 4A—4A of FIGS. 1 and 3.

Switch actuating disk 9 (circular in shape) is freely rotatable on reduced end portion 4b of shaft 4 (FIGS. 1, 2, 4, 4A and 4C) and is adapted to be locked in rotatable adjusted position to dial 12 by means of arcuate slot 9a in disc 9 and threaded bolt and washer assembly 9b, the bolt of which extends thru the slot 9a and is threaded into the dial 12 (FIGS. 3 and 4B). Disc 9 is retained in position on reduced shaft portion 4b by threaded bolt and washer assembly 9h, the bolt of which is threaded into the end of shaft 4. The switch actuating disc 9 protrudes radially beyond the dial 12, as shown. The dial 12 is calibrated in A.C. cycles which will be described in greater detail hereinafter and the disc 9 is provided with an arrow 9f on depressed surface 9g located radially outwardly from the dial (FIGS. 1, 3, 4, 4A and 4C) for adjusting the rotational position of the disc 9 about shaft 4 and with respect to the dial 12. Although disc 9 is freely rotatable on reduced shaft portion 4b, because it is locked to dial 12 in adjusted position by bolt 9b and because dial 12 is clamped fast to the shaft 4, disc 9 rotates with the shaft and dial 12. Disc 9 also has a small hole 9c in depressed area 9g of said disc on the same radial line as arrow 9f. The radial distance to the center of this hole from the center of shaft 4 is the same as the radial distance from the center of shaft 4 to the center of the light sensitive element 8i in photo electric switch 8 and its aligned light source 6. Disk 9 is sufficiently large in diameter so that it extends between light sensitive element 8i and source of light 6 to thereby block light from source 6 reaching light sensitive element 8i except when hole 9c is rotated to a position in which it is directly in line with light source 6 and the light sensitive element 8i of switch 8. Disc 9 also has a window 9e to permit observation of the graduations on raised portion 12g of dial 12. Depressed area 9g is on the same level as the graduations on dial 12, as shown in FIG. 4. The inner arcuate surface 21i of raised portion 12c of boss 12d of dial 12 corresponds in curvature to the outer periphery of disc 9, as shown.

When shaft 4 is rotated one revolution, disk 9 rotates with the shaft until hole 9c is aligned with light source 6 and light sensitive element 8i of switch 8 after rotation over a predetermined arc (depending on the adjustment of disc 9 about shaft 4 and switch 8 about shaft 4), whereupon the light from source 6 passes through the hole 9c to light sensitive element 8i to thereby actuate the switch and initiate welding current. The conventional ignitron weld timer 8g (FIG. 1) in the primary circuit 8h of the welding transformer automatically cuts off welding current a predetermined time after current initiation. This same rotation of the shaft 4 a complete revolution acting through cam 5 and housing 23 does the following in sequence: (1) moves electrode 32 downwardly into contact with work 34, (2) thereafter applies a yieldable welding pressure to the electrode before the switch 8 is actuated by disc 9, (3) at a predetermined time after switch initiation trips the dog 26 and causes the anvil 17 to impact the shank 30 and electrode 32 either slightly before, simultaneously with, or shortly after, current shut-off, (4) thereafter applies an increased static force to the electrode and finally (5) returns the electrode to its initial position shown in FIG. 2. It is extremely important that the impact reliably and consistently occurs at the proper time after current initiation and with respect to current cut-off.

To insure correct timing of instant of impact relative to weld current timing a correct angular relationship must exist between anvil operating cam 5, switch bracket 8a and switch operating disc 9. This relationship is established as follows: The arrow 9f and hole 9c on disc 9 are set opposite 0 on dial 12 and the disc is clamped to dial 12 in this position by means of threaded bolt 9b, as shown in FIG. 1. Dial 12 is then unclamped by loosening bolt 12b so that it, with 9 clamped thereto, is free on shaft 4. Switch bracket 8a is clamped to bracket boss 7a with the bolt 8e approximately midway in its slot 8c. The upper edge 21b (FIGS. 1 and 2) of pressure adjusting sleeve 21 is set even with the 0 mark on scale 20 on shank 17.

With the distance "Y" between upper welding tip 32 and work 34 (FIGS. 1 and 2) approximately equal to the rise on cam 5 from A to B (FIG. 13), shaft 4 and cam 5 are now slowly rotated manually counter-clockwise (FIG. 1) until downward movement of yoke 23b, housing 23 and block 25 on housing 23 (caused by the rise on cam 5) trips dog 26 thereby releasing anvil 17, thus resulting in an impact blow to electrode shank 30. At this instant of impact, i.e., while the shaft 4 and cam 5 are in the rotational position at which such impact occurs, dial 12, together with disc 9 clamped thereto, which are free on shaft 4, are manually rotated about shaft 4 until arrow 12e on dial 12 is directly in line with fixed arrow 7f on fixed bracket 7. Dial 12 is then clamped to shaft 4 in this position. Hole 9c and arrow 9f on disc 9 and the "0" mark on dial 12 will now be very close to light source 6 and light sensitive element 8i since angle $B_2$ was made the same as angle $C_2$. With the dial and disc clamped to shaft 4 in this position and the cam and shaft in impact position, switch bracket arm 8a is now unclamped and rotated in either direction until hole 9c is aligned with source 6 and light sensitive element 8i to thereby actuate the switch 8 to initiate welding current. Bracket 8a is now clamped in this position to fixed bracket 7a.

Figure 13:
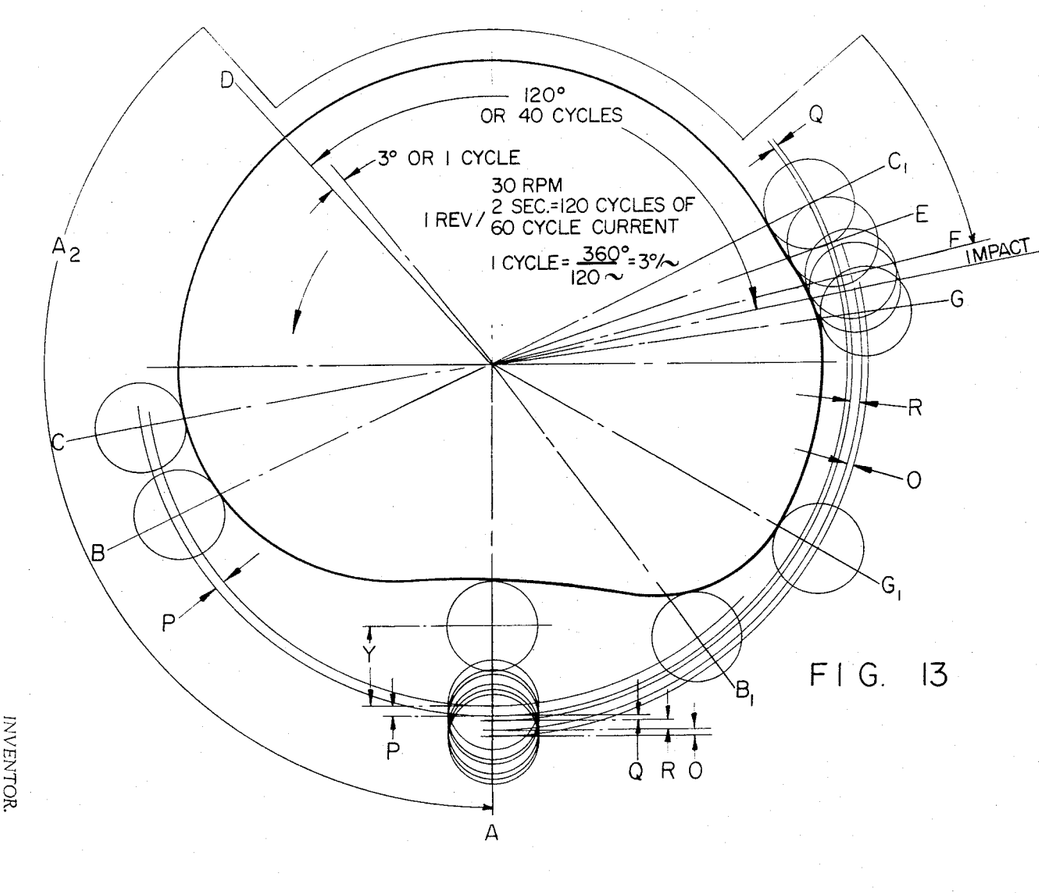
FIG. 13 shows the cam for controlling electrode pressure and impact together with the position thereof with respect to the cam follower at different sequential rotational stages A, B, C, $C_1$, D, E, F, Impact, G, $G_1$ and $B_1$ over a single cam revolution and with the amount of movement of the cam follower caused by cam rotation between the various stages being indicated as Y, P, Q, R and Q.

The system is now synchronized so that during one revolution of shaft 4, actuation of switch 8 (initiation of weld current) and impact occur at the exact instant during rotation when arrow 12e is exactly opposite fixed arrow 7f and this condition will remain constant so long as the mechanical characteristics of the system remain constant. Since disc 9, with hole 9c is clamped to dial 12 with arrow 12e, the angular relationship of arrow 12e to hole 9c cannot change during revolution of shaft 4. Therefore, current initiation must always occur when arrow 12e is exactly opposite fixed arrow 7f. The exact instant of impact now becomes the only variable in the system (relative to the instant of current initiation and position of arrow 12e during revolution of shaft 4) if there is any change in the mechanical characteristics of the system which will alter the impact position between $C_1$ and G on cam 5 (FIG. 13). Since impact is audible and the alignment of arrows 12e and 7f is visible, any out of phase condition of instant of impact relative to current initiation can be readily detected by correlating noise of impact to position of arrow 12e relative to arrow 7f. Obviously, an out of phase condition of impact and current initiation will be indicated by a misalignment of arrows 12e and 7f at the instant of impact. These arrows are register markers and are provided for this purpose.

For instance, if pressure of spring 22 is increased to such an extent that flight time of anvil 17 is appreciably shortened, then impact will occur earlier in the shaft cycle, i.e., before weld current initiation and before arrow 12e has reached arrow 7f. Conversely, if the stroke of anvil 17 is increased so that flight time is lengthened, then impact will occur later, i.e., after weld current initiation and after arrow 12e has passed beyond arrow 7f. Impact is also retarded if there is mushrooming of welding tips 32 and 33 during use to such an extent that distance Y from upper tip 32 to work 34 is increased. Impact will then occur later (higher up on cam surface $C_1$ to G) after weld current initiation and after arrow 12e has passed beyond arrow 7f.

For the former condition, correction is easily made by raising bracket 24 with handwheel 59 until impact occurs when arrow 12e is directly in line with fixed arrow 7f. The mechanism is now again in phase so that impact occurs simultaneously with weld current initiation. For the latter conditions, correction is made by lowering bracket 24 with handwheel 59 to obtain the in phase condition.

It now can be stated that if impact occurs before arrow 12e has reached arrow 7f, then bracket 24 must be raised until impact occurs when arrows 12e and 7f are in alignment at which time system will again be synchronized. Conversely, if impact occurs after arrow 12e has gone beyond fixed arrow 7f, then bracket 24 must be lowered until impact occurs when arrows 12e and 7f are in alignment, at which time the system will again be synchronized.

Movement of bracket 24 vertically by rotation of handwheel 59 carries with it brackets 3 and 7, shaft 4, cam 5, housing 23, anvil 17, shank 30 and electrode 32, to thereby alter the distance between electrode 32 and work 34. In the case of mushroomed tips, which cause the distance Y to increase, housing 24, and with it electrode 32, are moved vertically downwardly by rotation of handwheel 59 to reestablish distance Y. When such distance is reestablished, the arrow 12e will be aligned with arrow 7f at the instant of impact so that impact and initiation occur simultaneously.

Thus, alignment of arrows 12e and 7f at the amount of impact and current initiation provides means for insuring a constant relationship between impact, current initiation and current shut-off and for compensation for changes in the mechanical characteristics of the system.

As aforesaid, the mechanism is now synchronized so that impact is simultaneous with both current initiation and alignment of arrows 12e and 7f.

Weld current initiation by switch 8 through hole 9c in disc 9 may now be made to occur at any point D (FIGS. 1 and 13) or beyond (between D and I) on cam 5 (see FIG. 13) depending on where arrow 9f on disc 9 is thereafter set on dial 12 and weld current cut-off may occur at any time after current initiation depending upon the time interval setting of the ignitron weld timer 8g.

Dial 12 being graduated in 3° intervals (3° between each line on the scale) or time of one A.C. cycle (shaft 4 rotates 3° during one cycle), if now arrow 9f on disc 9 is set at 40 on dial 12 (adjusted counter-clockwise with respect to dial 12, cam 5 and shaft 4) and the cam 5 rotates through one revolution, then current initiation will be at point D on the cam (FIG. 13) and impact will occur 40 cycles or 120° on the cam (3°×40) (the arc between 0 and 40 on the dial) after switch 8 is closed by rotation of hole 9c in disc 9 into alignment with light sensitive element 8i and light source 6. It is apparent that if switch initiation and impact occur at the same time, when arrow 9f on disc 9 is set at 0 on dial 12, then by adjusting the disc 120° counter-clockwise, with respect to the cam 5 to 40 (closer to switch 8), the switch will be actuated 120° before impact. If the ignitron weld timer is also set at 40 cycles time interval then impact will occur at the current cut-off point and 40 cycles after current initiation. If now the ignitron weld timer is set for a weld current interval of 10 cycles and the arrow 9f on switch actuating disc 9 is set at 15 on dial 12, then impact will occur 5 cycles after welding current cut-off. Conversely, if the weld timer is set at 15 cycles and the arrow 9f on disc 9 is set at 10 cycles on dial 12, then impact will occur 5 cycles before current cut-off. In the foregoing, the timing dial (not shown) on the ignitron weld timer and dial 12 on the welder are assumed to be calibrated in cycles of 60 cycles alternating current but equipment may be timed in increments of 10ths or 100ths of a second or any other increment of time provided the dials on the welder and timer are both calibrated in corresponding increments.

Although the use of arrow reference 12e rotatable with disc 12 and fixed arrow reference 7f are preferred, other reference means can be used to adjustably synchronize impact and current initiation and to indicate when the mechanism is out of adjusted synchronization. For example, a flashing light at the instant of current initiation can be coupled with the audible impact sound or the flashing of another light on impact, or a circuit can be provided in which a light flashes on or a buzzer buzzes only when current initiation and impact occur simultaneously or nearly simultaneously. Furthermore, although it is preferred to resynchronize impact and current initiation to compensate for changes in the mechanical characteristics of the system by adjusting the vertical height of the upper electrode, other ways of doing this can be used.

Operation of the mechanism is as follows: referring to FIGS. 2, 13 and 14, the rotational positions shown and marked on cam 5 in FIG. 13 with the letters A, B, C, $C_1$, E, F, G and $G_1$ correspond with the positions of the housing 23, anvil 17 and shank 30 shown and referred to by the same letters in FIG. 14. For example, when the cam is rotated to position B (FIG. 13) with respect to cam follower 19, the housing 23, block 25, anvil 17, pressure member 30 and dog 26 are in the positions shown in Position B, $B_1$ of FIG. 14.

As cam 5 rotates counter-clockwise (FIGS. 1, 2 and 13) from rest position A to position B (i.e., from a position in which A on the cam engages the cam follower 19 to a position in which B on the cam engages the cam follower), cam roller 19, yoke 23b, housing 23, block 25, anvil 17, electrode shank 30 and all of the mechanism in housing 24, including electrode 32, descend together the distance Y, which is equal to the cam rise between A and B, without relative motion from Position A (FIGS. 1, 2 and 14) unitl electrode 32 contacts work 34. The anvil 17, shank 30, housing 23 (including block 25) and dog 26 are now in Position B in FIG. 14, having been moved a distance Y, as shown in FIGS. 13 and 14. As electrode 32 is now resting on the work 34, no further vertical motion can occur in shank 30 and dog 26. As shank 30 can descend no further, additional rotation of cam from B to C compresses spring 29 by the distance P which is equal to rise of the cam from B to C, i.e. the housing 23 and anvil 17 move downwardly together relative to pressure member 30 a distance P to thereby compress spring 29, as shown in FIG. 14. This increased yieldable pressure is exerted on shank 30 which in turn transmits it to electrode 32 on work 34 and provides the initial contact or static pressure. This latter motion lowers housing 23 and anvil 17 the distance P (see FIG. 14) with respect to 30 to the positions shown in Position C, $C_1$ in FIG. 14, thus moving surface 39 of block 25 downwardly away from pin 27a, bringing the lower face 17g of shank 17 and the upper face 30f of shank 30 closer and moving surface 17d of recess 17c of anvil 17 closer to the dog 26. Rotation of cam 5 between points C and D (position at which 9 actuates switch 8 to initiate weld current) on cam 5 imparts no vertical motion to housing 23, this being a safety interval, i.e. the cam radii are constant between C and D. Rotation of the cam from D to $C_1$ after current initiation imparts no vertical motion either since the cam radii continues to remain constant over the arc D–$C_1$. Thus, there is no vertical movement of housing 23 from C to $C_1$, since the cam radii are constant over this arc. During interval $C_1$ to E on cam 5, sufficient vertical motion Q is imparted to housing 23 and anvil 17 (they continue to move together) relative to shank 30 to bring surface 17d on anvil 17 into contact with detent finger 26a on dog 26. Shank 30 and anvil 17 are now locked together. That is, anvil 17 is locked or held by dog or holding means 26 a predetermined distance $R_1$ (see FIG. 14, Position E) above shank 30 against further downward movement. The distance Q through which housing 23 and anvil 17 has been moved during rotation of the cam from $C_1$ to E, as shown in FIG. 14, is equal to the rise in the cam from $C_1$ to E shown in FIG. 13. Because room did not permit Positions E, F and G, $G_1$ to be located on the same level as Positions A, B, $B_1$ and C, $C_1$ in FIG. 14, I have shown level lines S–S' in positions C, $C_1$ and E to demonstrate the movement Q between such positions. From position A to position E the anvil has moved vertically together with the housing 23.

Further motion of cam 5 from E to F (FIG. 13) lowers housing 23 relative to the anvil 17 and shank 30 by the distance R (FIG. 14) equal to the rise of the cam between E and F (FIG. 13) and with it block 25 whose inclined surface 25f engages projection 26c of dog 26 and rotates it counter-clockwise away from wall 17f against the force of spring 28 to the trip point. As shank 17 cannot descend further, this latter movement of housing 23 from E to F compresses spring 22 by the amount R and also moves upper surface 23g of yoke 23b (see FIG. 2) downwardly away from jam nuts 18 the same distance R against the force of spring 22. This distance R or separation between nuts 18 and surface 23g on yoke 23b in Position F must be greater than $R_1$, the distance between anvil surface 17g and shank surface 30f in Position F, or no impact can occur. This relationship between R and $R_1$ can be controlled by adjusting nuts 18 to raise or lower anvil 17 relative to housing 23 and shank 30 and hence to raise or lower, with respect to dog 6, surface 17d on anvil 17 which engages dog 26. To explain more fully, if the anvil is lowered in housing 23 closer to the dog 26 by loosening nuts 18, less movement of the housing is required between Positions $C_1$ and E to bring the surface 17d into engagement with the dog which results in greater movement of the housing relative to the anvil 17 between Positions E and F after Position E has been reached which increases the distance R relative to $R_1$. At Position F on the cam, dog 26 is at the trip point and any further rotation of cam 5 will release the spring loaded anvil 17 and impact will occur on shank 30. Thus impact will occur at I between F and G on cam 5 (see FIG. 13), the rise O on the cam interval from F to G being overtravel to insure tripping. Since the cam rise between F and G is the distance O, the downward movement of housing 23 is also the distance O (FIG. 14).

During the interval G to $G_1$ on the cam after impact, no motion of housing 23 occurs since the cam radii between these positions are constant, this being the hold period for the weld to set. The static pressure of both springs 22 and 29 is on the electrode during this period.

Upon further rotation of the cam from $G_1$ back to A, the cam height drops back to A and springs 38 force the housing 23, anvil 17 and shank 30 to reverse their movements upwardly back to their A positions shown in FIGS. 1, 2 and 14; these parts moving en route back to their B positions when the cam moves to $B_1$ between $G_1$ and A.

Rotation of the cam from D to I (impact) equals 120° or 40 cycles of welding time or heat time when the arrow 9f on disc 9 is adjusted to 40 cycles on dial 12.

Figure 15:
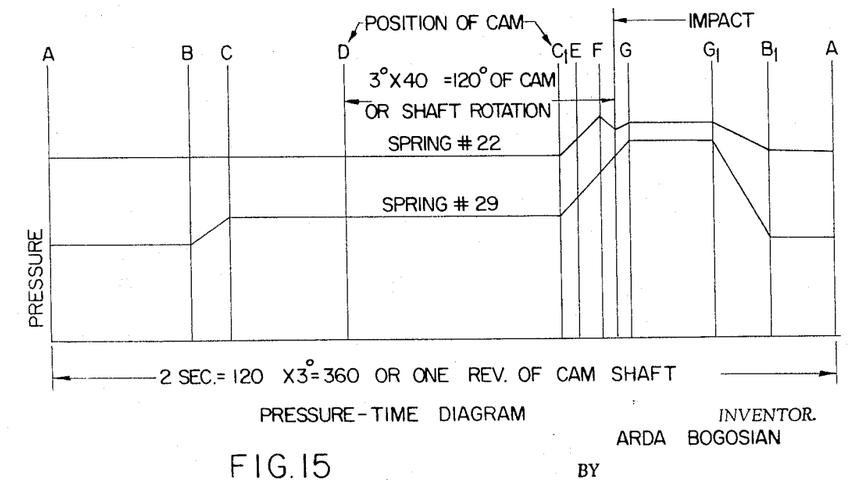
FIG. 15 is a graph showing the variations in pressure applied by the anvil urging spring and the pressure member urging spring of FIG. 2 over a single cam revolution.

FIG. 15 shows the pressure exerted by the springs 22 and 29 during one revolution of cam 5. Between B and I, only the pressure of spring 29 is exerted on the electrode, such pressure being constant between C and $C_1$ during which current is initiated at D. Thus, the pressure on the electrode is constant for a short time before current initiation and for a predeterimned time after initiation. Between I and G, the combined pressures of both springs are exerted on the electrode, such combined pressures being constant between G and $G_1$. Also, between G and $G_1$, the pressure of spring 29 on the electrode 32 is substantially higher than during the interval C, $C_1$. Pressure increase on the electrode occurs between B and C (by spring 29) and between $C_1$ and G (by spring 29 from $C_1$ to G and by spring 22 from I to G). Pressure drop on the electrode occurs between $G_1$ and $B_1$.

Nothing in the foregoing description should be construed as meaning that the machine must operate at 30 r.p.m. only. The fly-wheel 1 and shaft 4 may operate at any speed provided dial 12 is graduated in divisions of one or more cycles of current to correspond with r.p.m. of cam 5. For example, if the fly-wheel, shaft and cam are rotating at 15 r.p.m. then one cycle of current will equal 1½° on the cam and dial 12; or in other words, there will be 80 cycles of time heat in the 120° of cam and dial instead of 40 cycles.

Thus:

$$\frac{60 \text{ sec.}}{15 \text{ r.p.m.}} = 4 \text{ sec./rev.}$$

4 sec. × 60 cycles A.C. per second = 240 cycles/rev.

$$\frac{360°}{240 \text{ cycles}} = 1\tfrac{1}{2}° \text{ rotation of cam 5 and dial 12 per cycle of A.C.}$$

Pneumatic or hydraulic chambers may be substituted for springs 22 and 29 to provide the necessary independent initial contact pressure on electrode 32, impact force and increased static pressure after impact. Otherwise, mechanical operation remains the same as for spring operation. FIGS. 16 to 19 show such a construction. In these figures, parts 4A, 7A, 23Ab, 17A, 23A, 25A, 26A and 30A correspond to parts 4, 7 23b 17, 23, 25, 26 and 30, respectively, of FIGS. 1 and 2. However, instead of springs 22 and 29 acting between housing 23A and shanks 17A and 30A, respectively, sealed annular diaphragm bellows 42 and 43, respectively, are utilized, such bellows extending around the enlarged portions 40a and 41a of shanks 17A and 30A, respectively, and being received in enlarged diameter portions of the bore of housing 23A, as shown. Upper and lower annular bellows retaining and sealing collars 40 and 46, respectively, secure the top and bottom, respectively, of the diaphragm bellows 42 to the upper and lower ends of enlarged portion 40a of shaft 17A and upper and lower annular bellows retaining and sealing collars 41 and 47, respectively, secure the top and bottom, respectively, of the lower diaphragm bellows 43 to the upper and lower ends of enlarged portion 41a of shaft 30A. The upper ends of portions 40a and 41a are substantially smaller in diameter than the lower ends, as shown, the annular members 40 and 41 being about the same in diameter as the upper ends and the annular members 46 and 47 being about the same diameter as the lower ends. Parts 44 and 45 are automobile-tire-type air valves for filling the bellows with air and removing air therefrom to thereby adjust the air pressure. Part 48 is a lower end cap for housing 23A and also serves as a limit stop for the lower diaphragm bellows 43, whereas reduced diameter portion 49 of the housing 23A between the two enlarged diameter portions of the housing in which the bellows are located, acts as a guide for slidable shanks 17A and 30A as well as a lower limit stop for diaphragm bellows 42.

Housing 23A is provided with upper and lower shoulders 50 and 51 for compressing the upper and lower bellows 42 and 43, respectively, between the housing and the shanks 17A and 30A, respectively, upon downward movement of the housing 23A with respect to shanks 17A and 30A, respectively, the chambers within the upper and lower bellows being indicated as 49b and 49a, respectively. The peripheries of the bellows conform to the shape of the enlarged diameter portions of housing 23A below shoulders 50 and 51, in which enlarged diameter portions such bellows are received, the bellows being of the type and so arranged that during compression and expansion thereof the upper and lower portions thereof roll along and between the adjacent and opposed vertical walls of the housing and shanks at folds 42a, 42b, 43a and 43b, as will be apparent from FIG. 16. The portions of housing 23A above shoulders 50 and 51 receive members 40 and 41, respectively, and are slightly larger in diameter than members 40 and 41 to provide room therebetween for the upper annular folds 42a and 43a, respectively, of the upper and lower diaphragms. The enlarged portions of housing 23A receiving members 46 and 47 are also slightly larger in diameter than such members to provide room therebetween for the lower annular folds 42b and 43b, respectively, of the upper and lower bellows.

Air pressure, as required, is introduced into chambers 49 and 50 and, in operation, serve as springs. Air in the chambers is not consumed and does not act as a motor but is merely retained as in an automobile tire to act as compressible and yieldable units through which pressure is transmitted and which permit the desired relative movement between housing and shanks with resulting increase in pressure on the shanks by compression of the air, as in the case of the mechanical springs.

The pressure of the air in the chambers can be adjusted as in the case of spring tension. The pressure in the lower chamber may be greater than that in the upper chamber or conversely pressure in the upper chamber may be greater than that in the lower chamber.

Block 25A (FIGS. 16, 18 and 19) is like Block 25 in FIGS. 1 and 2 except that there are no side windows 25g as in the FIG. 2 embodiment. Also, dog 26A is like dog 26 except the pin 27A thereof does not extend beyond the shank 30A, the engagement of 47 with 48 retaining the shank 30A in the housing 23A.

Figure 16:
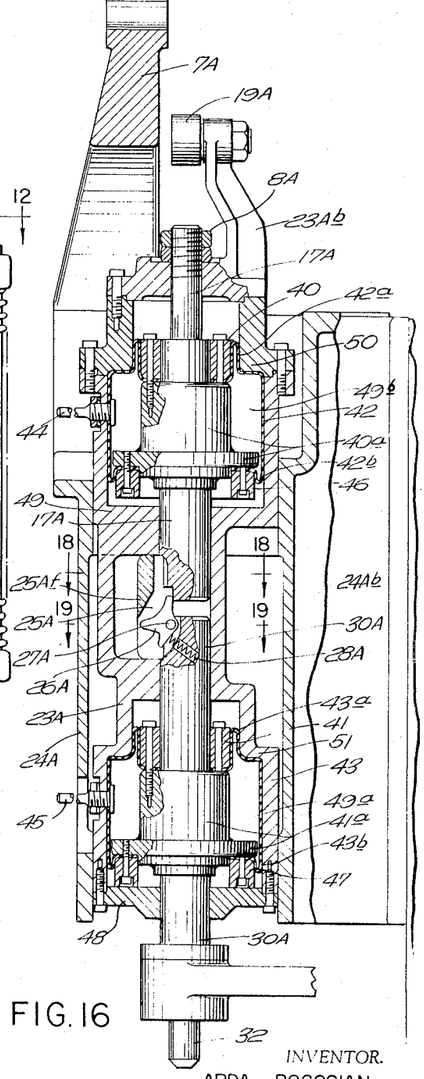
FIG. 16 is a view like FIG. 2 of another embodiment of the invention.
Figure 17:
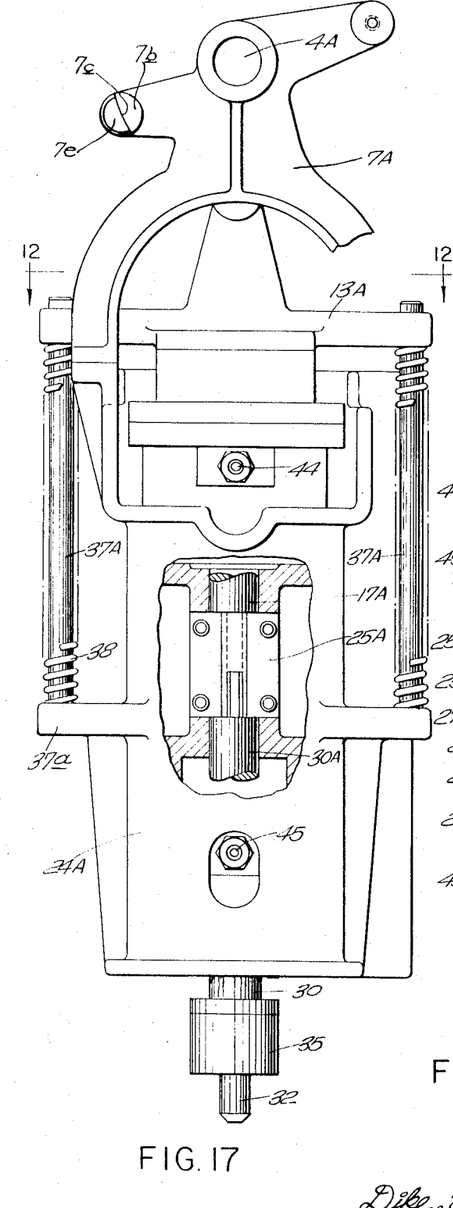
FIG. 17 is a view like FIG. 1 of the embodiment of FIG. 16 with a part broken away.
Figure 19:
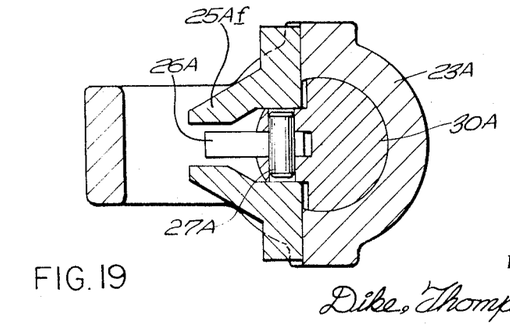
FIG. 19 is a section taken along the line 19—19 of FIG. 16.

The operation of the FIG. 16 embodiment is like that of the FIG. 2 embodiment except that (1) relative downward movement of the housing 23A with respect to shank 30A is resisted by the air in chamber 49a and the air is compressed to increase the force on the electrode, i.e., a yieldable welding force is applied to the electrode by the housing 23A through bellows 43, and (2) relative downward movement of housing 23A with respect to shank 17A is resisted by the air in chamber 49 and the air is compressed to thereby increase the force on anvil shank 17A prior to release of the anvil.

Both the springs and the pneumatic bellows may be considered as yieldable, elastic and compressible means acting between the slidable housing and the shanks to urge the shanks downwardly with respect to the housing. It is apparent that a tension spring could also be used to perform the same function and such a spring is considered as coming within the above means although it is tensioned rather than compressed.

This invention may also be adapted to use for what is called flash or butt welding in which the ends of two pieces of metal are butted against each other so as to permit the passage of electric current. At the correct fusion point the two pieces are suddenly forced together to form the weld.

Reference heerin to an anvil member, pressure member, housing and carrying member, includes in each instance a plurality of members as well as a single member.

I claim:

1. An electric spot welding apparatus having in combination, rotatable means having a cam and a welding current initiating member rotatable together with said rotatable means, means operated by rotation of said cam with said rotatable means a single revolution to apply a yieldable static pressure to an electrode and to subsequently apply in timed sequence a mechanical impact blow to said electrode followed by an increase in yieldable static pressure applied to the electrode for a predetermined time after impact, means operated by rotation of said current initiating member to initiate welding current, said current initiating member and said cam beng angularly located with respect to each other so that said current is initiated in timed sequence with the application of said static pressure and said impact occurs in timed sequence with initiation of said current.

2. An electric spot welding apparatus having a movable electrode and comprising in combination means for applying an adjustable yieldable initial welding pressure to said electrode for a predetermined time interval, means for initiating welding current while said pressure is applied, timing means for automatically cutting off said current after the lapse of a predetermined time interval, means, including an anvil, for applying an adjustable impact force to said electrode after said current initiation and in timed sequence with said current initiation and cut-off, said impact means exerting an increased yieldable pressure on said electrode for a predetermined time interval after impact; means for adjusting the force of said impact and the force of said initial welding pressure independently of each other, said means for increasing impact force also comprising means for adjusting the increase in force after impact independently of said initial force and means for adjusting welding current initiation and cut-off relative to instant of impact to provide for impact at any predetermined interval of time before or after current cut-off and also to provide adjustable predetermined heat interval.

3. Apparatus according to claim 2, including means for adjusting welding current initiation and cut-off relative to flight time of said anvil to compensate for varying velocity of the anvil due to adjustment of impact force.

4. Apparatus according to claim 2, said means for adjusting said initial force comprising means for adjusting said force without affecting the timing of impact.

5. An electric spot welding apparatus having a pressure member to which an electrode is connected and an anvil movable against and away from said pressure member, means urging said anvil toward said pressure member, holding means for limiting movement of said anvil toward said pressure member and to hold said anvil in spaced relation to said pressure member, means for releasing said holding means, rotatable means having a cam, means responsive to rotation of said cam to move said pressure member to apply and maintain a yieldable welding pressure to said electrode and to subsequently, in timed sequence with the application of said welding pressure, release said holding means whereby said means for urging said anvil forces said anvil to impact said pressure member and hence said electrode, means responsive to rotation of said rotatable means to initiate welding current, the shape of said cam and the rotational position of said rotatable means at which said current is initiated being correlated to initiate said current in timed sequence with the application of said yieldable pressure and to release said anvil to impact said pressure member in timed sequence with said current initiation.

6. An apparatus according to claim 5, said means responsive to said rotation of said cam comprising a carrying member carrying said anvil and said pressure member and movable axially by rotation of said cam, yieldable, elastic means acting between said carrying member and said pressure member to urge said pressure member toward the work to be welded, said carrying member, pressure member and anvil being movable together to bring said electrode into engagement with the work to be welded by initial rotation of said cam, said carrying member, upon said engagement of said electrode, being axially movable with respect to said pressure member against the force of said elastic means in response to further rotation of said cam, whereby yieldable pressure is applied to and maintained on said electrode, said rotatable means being rotated to current initiating position to initiate welding current upon further rotation of said cam, said carrying member being further movable with respect to said pressure member and anvil in response to a predetermined amount of further rotation of said cam to release said holding means and hence said anvil, whereby said means for urging said anvil toward said pressure member forces said anvil to impact said pressure member.

7. An apparatus according to claim 6, said carrying member and anvil being movable together and with respect to said pressure member by further rotation of said cam a predetermined amount after said current initiation but before release of said holding means until said anvil is engaged by said holding means which holds said anvil against further movement and in spaced relation with said pressure member, said means for urging said anvil comprising second yieldable elastic means acting between said carrying member and anvil, said movement of said carrying member relative to said anvil and pressure member after engagement by said holding means but before release of said holding means being against the force of said second elastic means whereby the force urging said anvil toward said pressure member is increased to thereby increase the force of impact of said anvil against said pressure member.

8. An apparatus according to claim 7, said rotating cam acting through said carrying member, pressure member and said first elastic means to maintain said yieldable pressure on said electrode from the time it is applied to a predetermined time after impact, said second elastic means urging said anvil against said pressure member during a predetermined time after impact to thereby increase the pressure on said electrode during said last mentioned predetermined time.

9. An apparatus according to claim 7, said means for initiating current comprising a current initiating member rotatable with said rotatable means and said cam, the rotational position of said current initiating member and said cam being adjustable to adjust the time sequence between current initiation and impact, said apparatus also including a timer in the welding current circuit to automatically shut off said current at a predetermined time after said current is initiated by said current initiating member, said current shut-off and impact being in timed sequence according to the shape of said cam, the relative adjusted positions of the cam and current initiating member and the time for which the timer is set.

10. An apparatus according to claim 7, said holding means comprising a detent member pivotally attached to said pressure member and a shoulder on said anvil adapted to be moved against said detent member to hold the two in spaced relation, said means for releasing said holding means comprising an inclined surface on said carrying member movable with said carrying member and with respect to said anvil and pressure member against a portion of said detent to pivot it out of engagement with said shoulder to release said anvil upon further rotation of said carrying means after said shoulder is moved against said detent.

11. An apparatus according to claim 10, said detent being spring biased inwardly to engage said shoulder, said inclined surface rotating said detent member out of engagement with said shoulder against said spring biasing.

12. An apparatus according to claim 7, said carrying member comprising a vertical housing in which said anvil and pressure member are slidably received in axial alignment, said first elastic means urging said pressure member downwardly out of the lower end of said housing, a holding surface on said housing normally operably engaging said pressure member to hold said pressure member in said housing, said holding surface being moved away from engagement with said pressure member upon vertical downward movement of said housing with respect to said pressure member after said electrode is brought into engagement with said work, said second elastic means urging said anvil downwardly in said housing toward the upper end of said pressure member, said housing having a holding surface normally holding said anvil against downward movement with respect to said housing against said pressure member until said anvil engages said holding means and is thereby prevented from moving any further downwardly, whereupon further movement of said housing with respect to said anvil moves said anvil holding surface downwardly out of holding engagement with said anvil against the force of said second elastic means to increase the force exerted thereby and to permit the anvil to impact the pressure member upon release of said holding means.

13. An apparatus according to claim 12, said first and second elastic means comprising springs, said movement of said housing and anvil with respect to said pressure member after engagement of the electrode with the work compressing the first spring to increase the pressure on the electrode, said movement of said housing with respect to the anvil and pressure member after engagement of said anvil with the holding means to prevent further movement of the anvil, compressing the second spring to increase impact force upon release of said holding means, means for adjusting the vertical position in which said anvil is normally held in said housing to thereby adjust the normal distance between said anvil and pressure member and the amount of movement of said housing with respect to said anvil after said anvil engages said holding means but before release of said holding means.

14. Apparatus according to claim 9, the pressure exerted by said second elastic means on said anvil being adjustable to vary the force of impact.

15. An apparatus according to claim 14, including a switch mounted on said rotatable means for actuation by said current initiating member, means for adjusting the position of said switch about said rotatable means, means for preventing rotation of said switch with said rotatable means, adjustment of said switch adjusting the time interval between current initiation, and hence current shut-off, and impact.

16. Apparatus according to claim 6, said carrying member having a cam follower and means for urging said cam follower into engagement with said cam whereby rotation of said cam actuates said carrier member in a predetermined manner, said cam having a low area at which said electrode is in non-operable position away from the work, the radii of said cam increasing upon rotation thereof to force said carrying member and said pressure member to move toward the work to weld position against the work, the cam radii continuing to increase thereafter upon further rotation of the cam to move said carrying member with respect to said pressure member and thereby increase the yieldable pressure on said electrode exerted by said first elastic means to a predetermined welding pressure, the cam radii thereafter remaining the same over a substantial arc of rotation to maintain said pressure, said welding current being initiated while said constant radii area of the cam is in contact with the cam follower and hence while said welding pressure is maintained, said constant radii area remaining in contact with said cam follower over a predetermined arc of cam rotation subsequent to said current initiation to thereby maintain said pressure, the radii of the cam thereafter increasing upon further cam rotation to move said carrying member to thereby release said holding means, whereupon the anvil is released and impacts the pressure member.

17. An apparatus according to claim 16, said current initiating means comprising a current initiating member rotatable with said cam and rotatable means, said apparatus including timing means in said welding circuit for automatically cutting off said current within a predetermined time after said current is initiated, said timing means, the relative position of said cam and current initiating member and the shape of said cam being coordinated to coordinate time of impact with current initiation and current cutoff.

18. An apparatus according to claim 17, the impact force of said anvil and the magnitude of said welding pressure both being independently adjustable.

19. An apparatus according to claim 17, including second elastic means acting between said anvil and carrying member to urge said anvil toward said pressure member, said carrying member having a holding surface engaged by said anvil to normally hold said anvil against movement with respect to said carrying member towards said pressure member, said increase in cam radii after said constant radii area first moving said carrying member and said anvil with respect to and toward said pressure member into engagement with said holding means, which thereafter holds said anvil above said pressure member in spaced relation thereto against further movement toward said pressure member, whereafter further movement of said carrying member by continued increase in cam radii is relative to said anvil and pressure member and is against the force of said second elastic means, whereby the force exerted on said anvil by said second elastic means is increased and said anvil holding surface on said carrying member is moved out of engagement with said anvil, whereafter further movement of said carrying member by further increase in cam radii releases said holding means, whereby said anvil impacts said pressure member, the radii of the cam thereafter remaining the same over a predetermined arc of rotation whereby said anvil continues to exert an added pressure on said pressure member for a predetermined interval of time, the pressure of both of said first and second elastic means being exerted on said electrode over said constant cam radii interval after impact, whereafter the cam radii upon further cam rotation, decreases back to said low area, whereby said means urging said carrying member and cam follower against said cam forces said carrying member, anvil and pressure member to reverse their aforesaid movements back to their initial non-operative positions.

20. An apparatus according to claim 19, each of said elastic means comprising at least one of spring means and compressible pneumatic means.

21. An apparatus according to claim 20, said elastic means each comprising spring means, the first spring means being compressed by said relative movement between the carrier and pressure member to thereby increase pressure on said electrode and said second spring means being compressed by said relative movement between said carrying member and said anvil to thereby increase the force urging said anvil toward said pressure member.

22. An apparatus according to claim 21, the initial compression of said springs being adjustable.

23. An apparatus according to claim 5, said means for initiating welding current comprising a switch actuator rotatable with said rotatable means and said cam, said apparatus including a switch mounted on said rotatable means but fixed against rotation therewith, said switch being normally spaced about said rotatable means a predetermined number of degrees from said switch actuator and being actuated by said switch actuator when said actuator is rotated with said cam said predetermined number of degrees, the position of said switch about said rotatable means being adjustable to thereby adjust said predetermined number of degrees, said apparatus including timing means for shutting off said current at a predetermined time after initiation thereof, said rotatable means, cam and actuator rotating a predetermined number of degrees per A.C. cycle of weld current, said apparatus including a graduated scale rotatable with said rotatable means, said actuator being rotatably adjustable with respect to said cam, said rotatable means and said scale in accordance with said scale graduations angularly toward and away from said switch to thereby adjust said predetermined number of degrees and hence the time between current actuation and impact and means for locking said actuator in adjusted position.

24. An electric spot welding apparatus comprising in combination, a pair of electrodes, rotatable means, means operated by rotation of said rotatable means a single revolution to initiate welding current, means also operated by rotation of said rotatable means a single revolution to move one of said electrodes from non-weld position to weld position in timed sequence before said initiation of said weld current and to apply an impact to said electrode in timed sequence after said initiation of said current, said last mentioned means comprising an impact member and impact control means rotatable with said rotatable means to control said impact member, means for adjusting the angular position of said current initiating means and said impact control means with respect to each other to adjust the time sequence between impact and current initiation over a range including zero time sequence at which impact and current initiation are simultaneous, and means for synchronizing time of impact with time of current initiation to compensate for changes in the mechanical system which change the instant of impact, said synchronizing means comprising reference means rotatable with said current initiation means and reference means fixed with respect to said rotatable current initiation means and past which said rotatable reference means rotates during said single revolution, the positioning of said fixed and rotatable reference means, said current initiating means and said impact control means with respect to each other being such that upon rotating said rotatable means at a particular adjusted time sequence, said reference means rotatable with said current initiating means will rotate to a particular position with respect to said fixed reference means at the instant of impact, whereby any change in the instant of impact due to changes in the mechanical system can be detected by the instant of impact varying from the instant said moving reference means moves to said particular position with respect to said fixed reference means, and means for adjusting the instant of impact so as to again provide impact at the same time that said movable reference means reaches said particular position with respect to said fixed reference means.

25. An apparatus according to claim 24, said particular adjusted time sequence being zero so that instant of impact and current initiation are simultaneous, said particular position of said movable reference being one in which said movable reference is aligned with said fixed reference at the instant of simultaneous current initiation and impact, whereby any change in the instant of impact due to changes in the mechanical system can be detected by the instant of impact varying with the instant at which said references are aligned.

26. An apparatus according to claim 25, said means for adjusting the instant of impact comprising means for adjusting the vertical height of said electrode in non-weld position.

27. An apparatus according to claim 25, said apparatus including a switch mounted on said rotatable means for angular adjustment therearound but locked against rotation therewith in adjusted position, said impact control means comprising a cam rotatable with said rotatable means, said current initiating means comprising a dial member adjustable around and rotatable with said rotatable means and a switch actuating member angularly adjustable with respect to said dial member and means for locking said switch actuating member to said dial in adjusted position for rotation therewith, said dial having said movable reference thereon.

28. An apparatus according to claim 27, said switch comprising a photo electric switch having a light sensitive element and a source of light for actuating the same, said switch actuating member comprising a disc having a peripheral portion rotatable between said element and said source, said peripheral portion having a hole therein which is rotated between said element and said source upon rotation of said rotatable means to thereby actuate said switch and initiate welding current.

References Cited by the Examiner
UNITED STATES PATENTS

| | | | |
|---|---|---|---|
| 1,861,005 | 5/1932 | Gibb | 219—80 |
| 2,312,938 | 3/1943 | Stieglitz | 219—89 |

RICHARD M. WOOD, *Primary Examiner.*

B. A. STEIN, *Assistant Examiner.*